(12) United States Patent
Arhab et al.

(10) Patent No.: US 10,094,430 B2
(45) Date of Patent: Oct. 9, 2018

(54) TORQUE TRANSMISSION MODULE INTENDED TO BE PART OF MOTOR VEHICLE TRANSMISSION

(71) Applicant: VALEO EMBRAYAGES, Amiens (FR)

(72) Inventors: Rabah Arhab, Saint-Brice-Sous-Foret (FR); Herve Ribot, Peronne (FR); Laurent Caumartin, Beauquesne (FR)

(73) Assignee: Valeo Embrayages, Amiens (FR)

( * ) Notice: Subject to any disclaimer, the term of this patent is extended or adjusted under 35 U.S.C. 154(b) by 213 days.

(21) Appl. No.: 14/851,701

(22) Filed: Sep. 11, 2015

(65) Prior Publication Data
US 2016/0084325 A1 Mar. 24, 2016

(30) Foreign Application Priority Data

Sep. 18, 2014 (FR) ..................................... 14 58837

(51) Int. Cl.
| | |
|---|---|
| *F16D 25/10* | (2006.01) |
| *F16D 13/72* | (2006.01) |
| *F16D 13/74* | (2006.01) |
| *F16D 13/76* | (2006.01) |
| *F16D 13/38* | (2006.01) |
| *F16H 3/00* | (2006.01) |
| *F16D 25/12* | (2006.01) |
| *F16D 21/06* | (2006.01) |

(52) U.S. Cl.
CPC ........... *F16D 25/10* (2013.01); *F16D 13/385* (2013.01); *F16D 13/72* (2013.01); *F16D 13/74* (2013.01); *F16D 13/76* (2013.01); *F16D 25/123* (2013.01); *F16H 3/006* (2013.01); *F16D 2021/0607* (2013.01); *F16D 2300/26* (2013.01)

(58) Field of Classification Search
CPC .......... F16D 13/76; F16D 13/72; F16D 13/74; F16D 13/385; F16D 2300/26; F16D 2021/0607; F16D 2021/0692; F16D 2021/0661; F16H 3/006
See application file for complete search history.

(56) References Cited

U.S. PATENT DOCUMENTS

| | | | |
|---|---|---|---|
| 2004/0206599 A1* | 10/2004 | Hegerath | ................ F16D 21/06 192/48.611 |
| 2005/0082136 A1* | 4/2005 | Braford | ................... F16D 21/06 192/48.91 |

(Continued)

FOREIGN PATENT DOCUMENTS

| | | |
|---|---|---|
| DE | 102010022237 A1 | 11/2011 |
| WO | 9424450 A1 | 10/1994 |

*Primary Examiner* — Jacob S. Scott
*Assistant Examiner* — Lillian T Nguyen
(74) *Attorney, Agent, or Firm* — Berenato & White, LLC

(57) ABSTRACT

A torque transmission module (M) intended to be part of a motor vehicle transmission (1), comprising:
 a cover (10),
 a double wet clutch mechanism (11) movable rotationally around an axis (X), and
 a clutch cover (12) having an oil distribution device intended to supply oil to the double wet clutch,
the cover (10) and the clutch cover (12) being assembled so as to form a casing defining a receptacle in which the double wet clutch mechanism is partly received, the casing being able to be received entirely or in part in a clutch housing (5) of the transmission.

23 Claims, 5 Drawing Sheets

(56) References Cited

U.S. PATENT DOCUMENTS

| | | |
|---|---|---|
| 2005/0087420 A1* | 4/2005 | Schafer .................. F16D 21/06 |
| | | 192/55.61 |
| 2006/0144665 A1* | 7/2006 | Janson ..................... B60K 6/48 |
| | | 192/48.8 |
| 2007/0089962 A1* | 4/2007 | Enstrom ................ B60K 6/387 |
| | | 192/48.614 |
| 2012/0247904 A1 | 10/2012 | Mitsubori et al. |
| 2013/0153355 A1* | 6/2013 | Kummer ............ F16D 25/0638 |
| | | 192/48.1 |
| 2014/0151181 A1 | 6/2014 | Reimnitz |

* cited by examiner

TORQUE TRANSMISSION MODULE INTENDED TO BE PART OF MOTOR VEHICLE TRANSMISSION

CROSS-REFERENCE TO RELATED APPLICATIONS AND CLAIM TO PRIORITY

This application claims priority to U.S. Pat. No. 1,458,837 filed Sep. 18, 2014 in France, the disclosure of which is incorporated herein by reference and to which priority is claimed.

FIELD OF THE INVENTION

The present invention relates to a torque transmission module intended to be part of a motor vehicle transmission.

BACKGROUND OF THE INVENTION

A torque transmission module of this kind is intended to constitute part of a transmission, in particular for a motor vehicle or for a so-called "industrial" vehicle, the latter being, for example, a truck, a common carrier vehicle, or an agricultural vehicle.

The present invention relates more particularly to a torque transmission module having a double wet clutch movable rotationally around a rotation axis (X), which is controlled to selectively couple a driving shaft of a combustion engine to a first driven shaft and to a second driven shaft of a gearbox, said double wet clutch mechanism having at least a first clutch and a second clutch respectively of the multiple-disc type, each of said first and second clutches having at least one axially movable piston that is controlled as to displacement by means of a control chamber with which is associated a compensating chamber delimited at least by a compensating piston, said piston causing axial clamping, in an engaged position, of a multiple-disc assemblage against reaction means, said multiple-disc assemblage having at least friction discs rotationally connected to an external disc carrier and flanges that are rotationally connected via at least one internal disc carrier to one of said first and second driven shafts.

Transmission systems of this kind having a double wet clutch mechanism, generally of the multiple-disc type, are known from the existing art, said mechanism being installed in the clutch housing of the motor vehicle.

In this type of transmission system, the friction linings of the discs must be kept constantly wet by oil. This constraint implies the provision of a very sophisticated oil distribution device, intended to supply oil to the double wet clutch, which is generally designed and implemented by the vehicle manufacturer. This oil distribution device generally comprises a high-pressure supply pump for the actuation of pistons, a servo controller for distributing oil between the two clutches, an oil distribution casing for conveying oil from the servo controller to the two wet clutches, and a clutch support that incorporates the oil supply channels of the double clutch mechanism.

It is known from the existing art for the oil distribution device to be supported entirely or in part by the clutch housing. During assembly of the motor vehicle transmission, the double wet clutch mechanism is then introduced separately into the production line, and assembly of the double wet clutch mechanism onto the clutch support is integrated by the vehicle manufacturer.

The double wet clutch mechanism is a fragile assemblage that needs to be handled with care during transport operations and during assembly on the production line.

Assembly of the mechanism onto the clutch support must perform two functions that are essential for proper operation of the transmission system: pivoting connection of the double clutch mechanism around the rotation axis (X), achieved by means of needle bearings; and oil sealing of the control chambers and compensating chambers of the two wet clutches, achieved by means of gaskets.

Assembly in this fashion is not without problems, however, since the risk exists of damage to gaskets and needle bearings during assembly. Because of this risk, the vehicle manufacturer must perform a check of the quality of this assembly operation at the end of the production line.

SUMMARY OF THE INVENTION

The object of the present invention is in particular to propose a torque transmission module having a double wet clutch mechanism, allowing at least some of certain disadvantages of the existing art to be eliminated.

To that end, the invention proposes a torque transmission module intended to be part of a motor vehicle transmission, comprising:
  a cover,
  a double wet clutch mechanism movable rotationally around an axis (X), and
  a clutch cover having an oil distribution device intended to supply oil to the double wet clutch,
the cover and the clutch cover being assembled so as to form a casing defining a receptacle in which the double wet clutch mechanism is partly received, the casing being able to be received entirely or in part in a clutch housing of the transmission.

This torque transmission module according to the invention has the advantage of proposing a subassembly independent of the clutch housing. The torque transmission module exists in the form of a casing that protects the double wet clutch mechanism during transport operations and assembly operations on the production line.

The invention can exhibit one or another of the characteristics described below, combined with one another or taken independently of one another.

Preferably said cover, the double wet clutch mechanism, and the clutch cover are pre-assembled to form a unitary assemblage.

This torque transmission module according to the invention has the advantage that, thanks to pre-assembly to form a unitary assemblage, an additional inspection step during factory assembly of the transmission is avoided, so that the vehicle manufacturer does not need to disrupt the production line. The torque transmission module can be operationally tested by the module manufacturer and no longer by the vehicle manufacturer.

According to the exemplifying embodiment of the invention, the oil distribution device can comprise at least one pump supported entirely or in part by the clutch cover.

Advantageously, the clutch cover supports a low-pressure oil supply pump.

Advantageously, the clutch cover supports a high-pressure oil supply pump.

Support of high-pressure and/or low-pressure pumps, entirely or in part, by the clutch cover allows production costs to be reduced, and the general reliability of the torque transmission module to be increased. The double wet clutch mechanism can have a splined torque input shaft extending axially toward the outside of the module and passing through the cover.

The splined torque input shaft is, for example, rotationally guided on the cover by means of a ball bearing.

The double wet clutch mechanism has an external envelope in the general shape of a figure of revolution.

According to the exemplifying embodiment of the invention, the cover, in the general shape of a bell, exhibits a first opening located at the apex of the cover and arranged for passage of the splined torque input shaft.

The cover, in the general shape of a bell, can exhibit a second opening delimited on its edge by an annular collar and located on the base of the cover.

Advantageously, the cover has a circular abutment region configured on the annular collar and arranged to come into abutment against the clutch cover of the motor vehicle transmission.

The abutment region can have an inner cylindrical surface for centering the cover on the clutch cover along the axis (X).

Advantageously, the first and second openings of the cover are circular and concentric around the axis (X).

The cover is preferably implemented from steel or aluminum as a material.

According to the exemplifying embodiment, the cover and the clutch cover are connected to one another by tightening a series of first fastening bolts.

The series of first fastening bolts is, for example, distributed circumferentially around the axis (X) on the periphery of the cover and of the clutch cover.

A gasket is preferably disposed between the cover and the clutch cover and is compressed by tightening the series of first fastening bolts.

The gasket can be of the O-ring type.

As a variant, the gasket is of the flat-gasket type.

The gasket is made in particular of Nitrile™, Viton™, or rubber as a material.

According to the exemplifying embodiment, the clutch cover, in the general shape of a bell, exhibits a first opening located at the apex of the clutch cover and arranged for passage of the gearbox shafts of the motor vehicle transmission.

The clutch cover, in the general shape of a bell, can then exhibit a second opening delimited on its edge by an annular collar and located on the base of the clutch cover.

Advantageously, the annular collar has a series of tapped holes able to receive the series of first fastening bolts.

Advantageously, the first and second openings of the clutch cover are circular and concentric around the axis (X).

The clutch cover can likewise exhibit a third opening, in the general shape of a circular arc, configured on the flank of the clutch cover, the radially outer edge of which delimits said third opening and is tangent to the annular collar.

Advantageously, the radially outer edge of the third opening is disposed with respect to the axis (X) on a diameter greater than or equal to the outer envelope of the double wet clutch mechanism.

This third opening has the advantage of preventing stagnant oil at the bottom of the torque transmission module from coming into contact with the double wet clutch mechanism. The result is to limit drag torque, and to improve torque transmission efficiency in general.

The clutch cover is preferably made of steel or aluminum as a material.

Advantageously, the clutch cover of the torque transmission module has a first circular abutment region configured on the annular collar of the clutch cover and arranged to come into abutment against the cover.

According to the exemplifying embodiment of the invention, the oil distribution device has an oil bypass box supported entirely or in part by the clutch cover.

Advantageously, the oil bypass box partly surrounds the first opening of the clutch cover.

The oil distribution device can have a hub support fastened on the clutch cover.

The hub support can have at least one oil supply channel intended to convey oil from outside the torque transmission module to the double wet clutch mechanism.

The oil bypass box can have at least one oil supply channel intended to convey oil from outside the torque transmission module to the double wet clutch mechanism.

The oil supply channel of the oil bypass box can then communicate with the oil supply channel of the hub support.

The oil bypass box can have oil supply channels distributed circumferentially around the first opening of the clutch cover.

The hub support and the clutch cover are preferably connected to one another by tightening a series of third fastening bolts.

A further object of the invention is to propose a transmission assemblage, in particular for a motor vehicle, having at least:
a clutch housing, and
the torque transmission module as defined above.

Advantageously, the clutch cover of the torque transmission module has a second circular abutment region configured on the annular collar of the clutch cover and arranged to come into abutment against the clutch housing of the motor vehicle transmission.

The second abutment region of the clutch cover has an outer cylindrical surface for centering the clutch cover on the clutch housing along the axis (X).

The torque transmission module is preferably fastened on the clutch housing of the motor vehicle transmission by tightening a series of second fastening bolts.

The transmission assemblage has the advantage of providing for simplified installation of the double wet clutch mechanism during factory assembly of the transmission. Installation is performed using conventional fastening bolts.

Advantageously, a gasket is disposed between the torque transmission module and the clutch housing of the motor vehicle transmission and is compressed by tightening the series of second fastening bolts.

The gasket can be of the O-ring type.

As a variant, the gasket is of the flat-gasket type.

The gasket is made in particular of Nitrile™, Viton™, or rubber as a material.

Preferably the series of second fastening bolts is distributed circumferentially around the axis (X) on the periphery of the clutch cover.

Advantageously, the first fastening bolts and the second fastening bolts are distributed circumferentially in alternating fashion around the axis (X).

The invention likewise relates to a transmission, in particular for a motor vehicle, for selectively rotationally connecting at least one driven shaft of the gearbox to a driving shaft of the combustion engine, said transmission having at least:
an engine flywheel rotationally connected to the driving shaft,
a mechanism for filtering irregularities,
a gearbox, said transmission having the torque transmission module according to the invention.

Advantageously, the torque transmission module is arranged axially between the engine flywheel and the gearbox.

The splined torque input shaft of the double wet clutch mechanism is preferably rotationally connected to the mechanism for filtering irregularities.

According to another aspect, a further object of the invention is to propose a torque transmission module intended to be part of a motor vehicle transmission, wherein said module has at least:
- a cover,
- a clutch cover,
- a double wet clutch mechanism, and
- an oil distribution device intended to supply the double wet clutch mechanism with oil, the device comprising at least one pump supported entirely or in part by the clutch cover.

Preferably at least the cover, the double wet clutch mechanism, and the clutch cover are pre-assembled to form a unitary assemblage.

The module according to this other aspect can encompass all or some of the characteristics mentioned previously.

BRIEF DESCRIPTION OF THE DRAWINGS

The invention will be better understood upon reading the description that follows, provided exclusively by way of example and referring to the attached drawings, in which.

DETAILED DESCRIPTION OF THE PREFERRED EMBODIMENT(S)

In the description that follows and in the claims, the terms "front" or "rear" will be used, in non-limiting fashion and in order to facilitate understanding, in accordance with the direction with respect to an axial orientation determined by the principal axis of rotation X of the motor vehicle transmission, as well as the terms "internal/inner" or "external/outer" with respect to the axis X and in accordance with a radial orientation orthogonal to said axial orientation.

Figure 1:
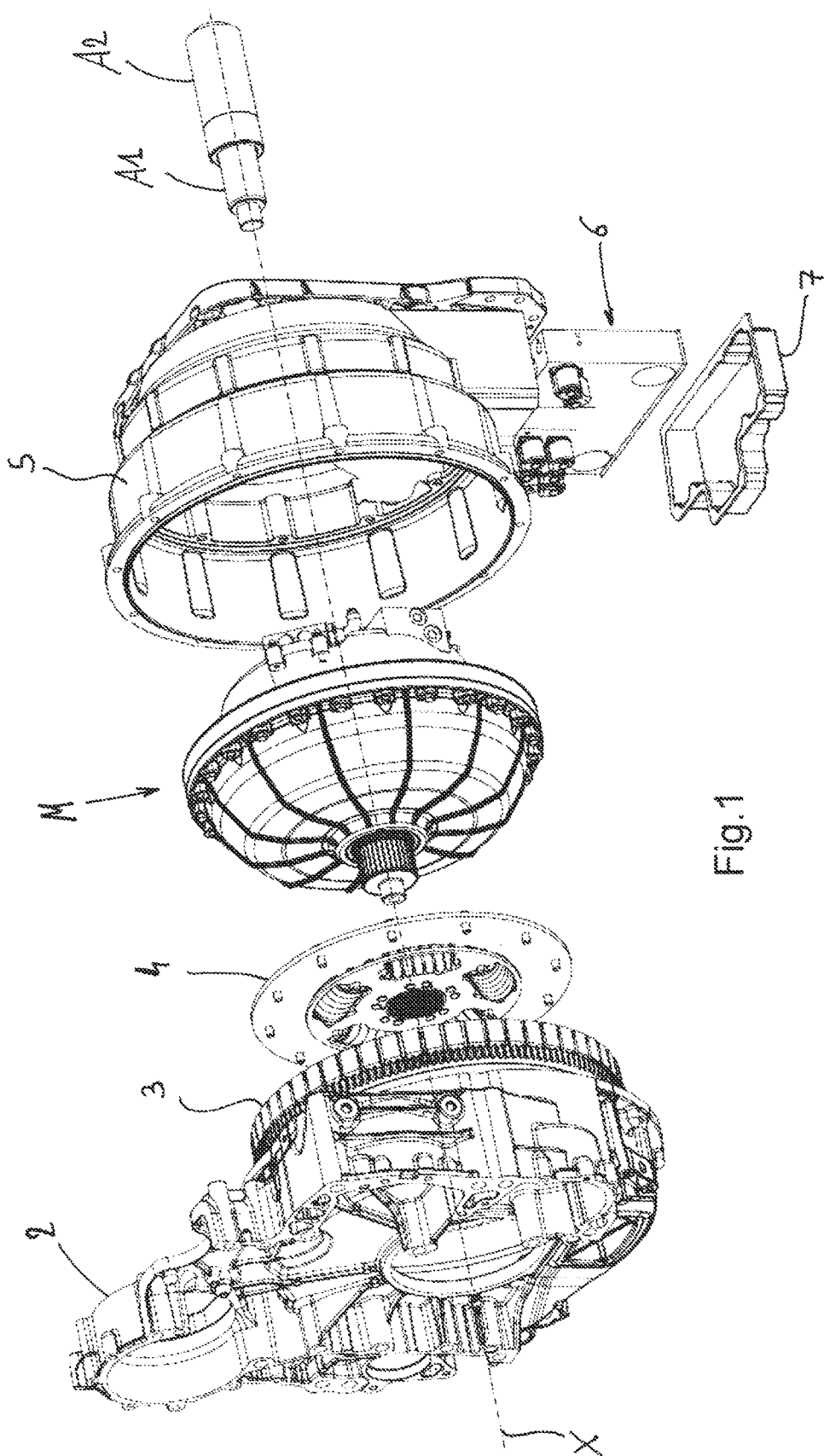
FIG. 1 is a perspective view of a kinematic transmission train having a torque transmission module according to a privileged embodiment of the invention.

FIG. 1 depicts a transmission 1 of a motor vehicle, comprising:
- a combustion engine casing 2,
- an engine flywheel 3,
- a mechanism 4, interacting with engine flywheel 3, for filtering irregularities,
- a torque transmission module M,
- a clutch housing 5 associated with combustion engine casing 2,
- a servo controller 6,
- an oil pan 7,
- two driven shafts A1, A2 of a gearbox (not depicted), associated with torque transmission module M.

Torque transmission module M, clutch housing 5, and oil pan 7 are assembled so as to form a container in which servo controller 6 is received. Servo controller is fastened on torque transmission module M.

Oil pan 7 is fastened onto clutch housing 5 by tightening fastening bolts (not depicted). A gasket (not depicted) is disposed between oil pan 7 and clutch housing 5, and is compressed by the tightening of the fastening bolts in order to create a seal with respect to a fluid, for example oil, present in clutch housing 5 and at the bottom of oil pan 7.

Figure 2:
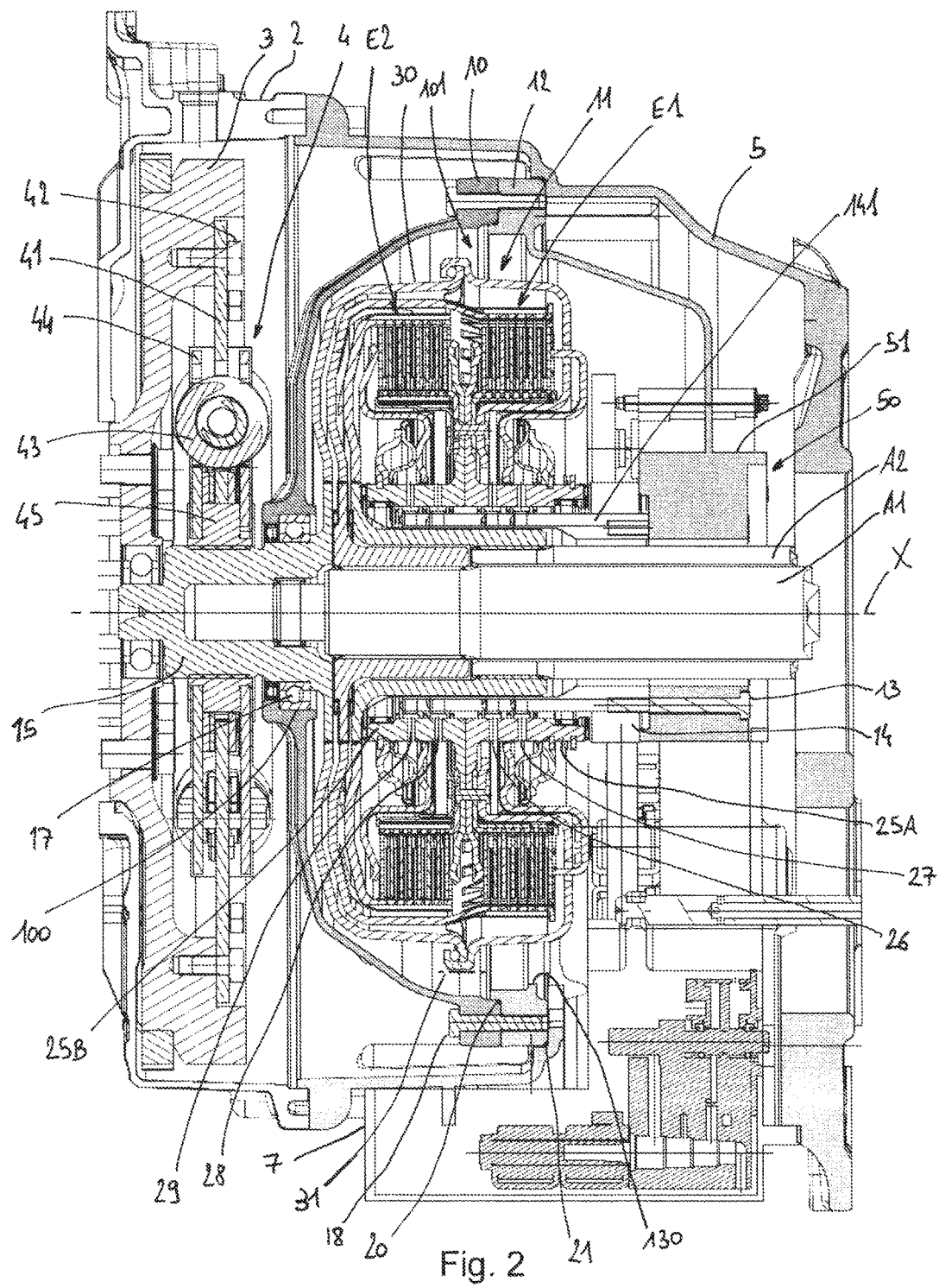
FIG. 2 is a sectioned view of the kinematic transmission train and of the torque transmission module, passing through axis X of FIG. 1.

FIG. 2 depicts certain components of transmission 1 of a motor vehicle, and the components of torque transmission module M.

Engine flywheel 3, fastened onto the crankshaft (not depicted) of combustion engine 2, is contained in the casing of the combustion engine. Engine torque is transmitted from the engine flywheel to the gearbox via a mechanism 4 for filtering irregularities. Mechanism 4 for filtering irregularities comprises a primary web 41 rotationally connected to engine flywheel 3 by way of fastening bolts 42. Primary web 41 is connected via helical springs 43 to a secondary member 44 constituted by two guide washers integral with a splined hub 45. Splined hub 45 is rotationally connected to a splined torque input shaft 15 of torque transmission module M.

Figure 3:
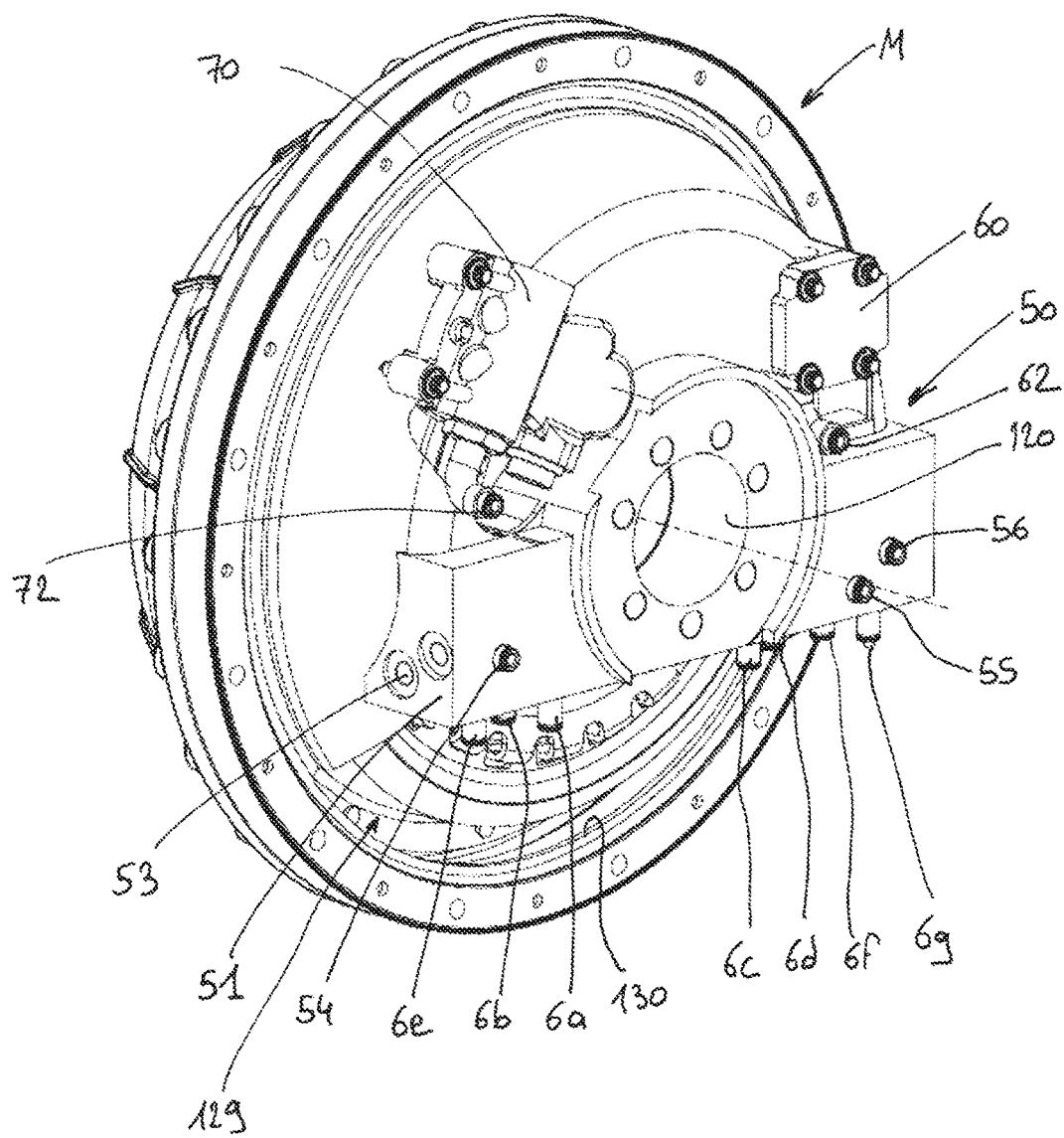
FIG. 3 is a perspective view of the torque transmission module of FIG. 1.

As illustrated in FIGS. 2 and 3, torque transmission module M comprises:
- a cover 10,
- a double wet clutch mechanism 11 movable rotationally around an axis (X), and
- a clutch cover 12, having an oil distribution device 50 intended to supply the double wet clutch with oil under the control of servo controller 6.

Oil distribution device 50 has a hub support 14 fastened on clutch cover 12. Hub support 14 rotationally supports double wet clutch mechanism 11 by means of needle bearings.

Cover 10 and clutch cover 12 are in the general shape of a bell. Cover 10 and clutch cover 12 are assembled so as to form a casing defining a receptacle in which double wet clutch mechanism 11 is received in part. Cover 10 and clutch cover 12 are produced using casting processes.

Double wet clutch mechanism 11 has a splined torque input shaft 15 that extends axially toward the outside of module M and passes through cover 10 via a first opening 100 located at the apex of the cover. Splined torque input shaft 15 is rotationally guided on cover 10 by means of a ball bearing 17. Ball bearing 17 ensures oil sealing at the rear portion of torque transmission module M.

Double wet clutch mechanism 11 has a outer envelope 31 in the general shape of a figure of revolution. This outer envelope defines the rotating volume of mechanism 11.

Double wet clutch mechanism 11 is controlled to selectively couple said driving shaft to a first driven shaft A1 and a second driven shaft A2 of the gearbox.

First driven shaft A1 and second driven shaft A2 are preferably coaxial.

The double wet clutch mechanism 11 has an input shell 30, at least a first clutch E1 and a second clutch E2, which are respectively of the multiple-disc type. Both the first clutch E1 and the second clutch E2 are disposed in the input shell 30, as illustrated in FIG. 2.

First driven shaft A1 is caused to rotate when said first clutch E1 is closed, and second driven shaft A2 is caused to rotate when said second clutch E2 is closed, said first and second driven shafts A1, A2 being respectively connected to a gearbox that is part of the motor vehicle.

In double wet clutch mechanism 11, first clutch E1 serves e.g. both for starting and for engaging the odd-numbered ratios, and second clutch E2 then handles the even-numbered ratios and the reverse gear; as a variant, the ratios handled by said first clutch E1 and second clutch E2 are interchanged.

First clutch E1 is arranged, for example, axially in front on the gearbox side, and second clutch E2 is arranged, for example, axially at the rear on the engine side.

First clutch E1 and second clutch E2 alternatively transmit input power (torque and speed) from the driving shaft, which is received by input shell 30 of mechanism 11, to one of the two driven shafts A1, A2 depending on the open or closed state of each of clutches E1 and E2.

Preferably first clutch E1 and second clutch E2 are in the open state, also called "normally open," and are actuated selectively during operation by a servo controller 6 in order to transition from the open state to the closed state.

Double wet clutch mechanism 11 is controlled hydraulically by means of a pressurized fluid, generally oil.

In order to selectively control the change of state of first clutch E1 and of second clutch E2 of the double wet clutch mechanism 11 of the torque transmission module M, the oil distribution device 50, which is disposed outside of the input shell 30, uses the hub support 14 having oil supply channels 141, for example four in number as depicted in FIG. 2.

Figure 7:
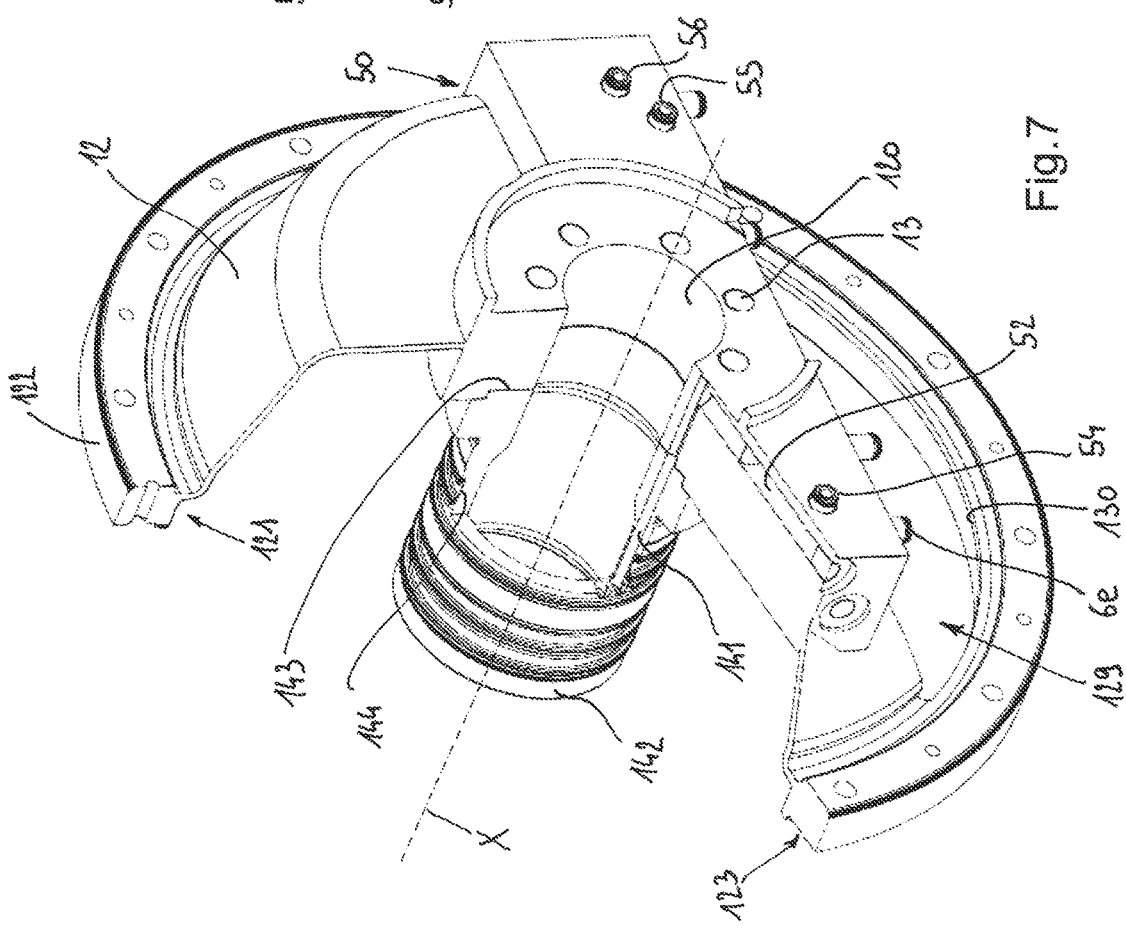
FIG. 7 is a perspective cutaway view of the clutch cover of FIG. 3.

As illustrated in FIG. 7, hub support 14 has the general shape of a figure of rotation, comprising an outer cylindrical surface 142 and a front face 143 abutting against clutch cover 12.

An oil supply channel 141 comprises in general a first axially oriented conduit opening onto front face 143 of the hub support, a second conduit orthogonal to axis X and opening into the first conduit, and a circular groove 144 machined on the periphery of outer surface 142, into which the second conduit opens.

In complementary fashion, double wet clutch mechanism 11 has at least a hub 25A, 25B having radial orifices that are each connected to one of oil supply channels 141.

Said at least one hub is preferably implemented in two portions: a first hub 25A and a second hub 25B respectively associated with first clutch E1 and with second clutch E2.

First hub 25A has two orifices 26 and 27 that are associated with control of first clutch E1 located axially in front, and second hub 25B likewise has two orifices 28 and 29 that are associated with control of second clutch E2 located axially at the rear.

First hub 25A and a second hub 25B pivot around hub support 14 along rotation axis X.

The four circular support grooves 114 of hub 14 are thus disposed axially opposite orifices 26, 27, 28, and 29 of hubs 25A and 25B, so as to separately supply the hydraulic piston chambers of clutches E1 and E2. A gasket is disposed between each groove in order to ensure sealing between the various supply channels. The gasket is generally of the O-ring type.

FIGS. 3 and 7 depict clutch cover 12, having an oil distribution device 50 intended to supply the double wet clutch with oil. Oil distribution device 50 itself has an oil bypass box 51 supported entirely or in part by clutch cover 12 and support hub 14. In the example described, the oil bypass box is integrated into clutch cover 12. Hub support 14 and clutch cover 12 are connected to one another by tightening a series of third fastening bolts 13.

As already shown previously, hub support 14 has four oil supply channels 141a, 141b, 141c, 141d. Oil supply channels 141a, 141b, 141c, 141d are implemented using machining means of the drilling type. Alternatively, oil supply channels 141a, 141b, 141c, 141d are implemented using casting means.

Clutch cover 12 likewise has a first opening 120 located at the apex of the clutch cover and arranged for passage of the gearbox shafts of the motor vehicle transmission.

Figure 6:
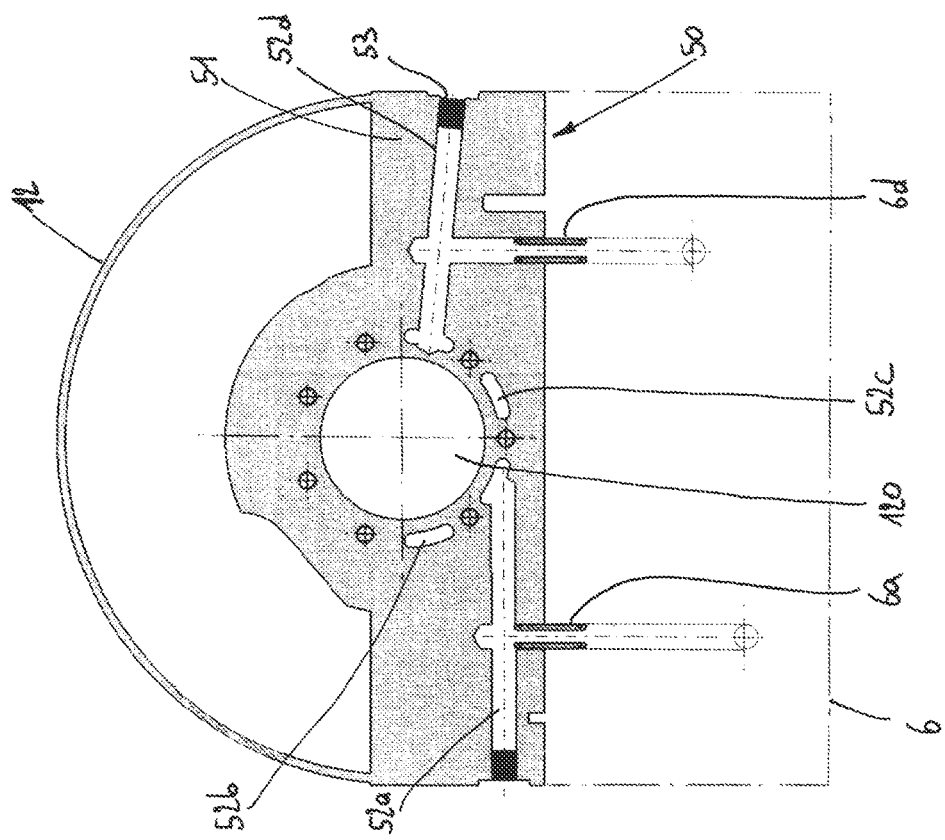
FIG. 6 is another view, in section along VI-VI, of the torque transmission module of FIG. 2.

As illustrated in FIG. 6, oil bypass box 51 partly surrounds first opening 120 of the clutch cover. Oil bypass box 51 has oil supply channels 52a, 52b, 52c, 52d likewise intended to convey oil from outside torque transmission module M to double wet clutch mechanism 11. Channels 52a, 52b, 52c, 52d are distributed circumferentially around first opening 120, and communicate respectively with oil supply channels 141a, 141b, 141c, 141d of hub support 14. Oil supply channels 52a, 52b, 52c, 52d communicate with servo controller 6 with the aid respectively of connecting means 6a, 6b, 6c, 6d.

Oil supply channels 52a, 52b, 52c, 52d are implemented using machining means of the drilling or milling type. Alternatively, oil supply channels 52a, 52b, 52c, 52d are implemented using casting means.

Oil distribution device 50 as depicted in FIG. 3 comprises two pumps 60, 70 supported by clutch cover 12. Clutch cover 12 thus has two abutment regions, generally machined into the substance and serving as a fastening face for the casings of pumps 60, 70. The pumps are fastened mechanically onto clutch cover 12 with the aid of fastening bolts. In the example described, the external casing of the pump is separate from the clutch cover.

Pump 70 here is of the low-pressure type 70, having the principal function of picking up oil from the bottom of oil pan 7 and delivering it to a cooling circuit located outside clutch housing 5.

The following paragraph will make it easier to understand the operation of the low-pressure oil circulation circuit:

Oil is drawn from the bottom of oil pan 7 by the low-pressure pump with the aid of a tube (not depicted) immersed in the oil reservoir. The tube is connected to a hydraulic inlet connector of the low-pressure pump. Low-pressure pump 70 delivers oil to a heat exchanger through an outlet connector 72. Oil cooled by the action of the heat exchanger returns to oil bypass box 51 through an inlet connector 54. The cooled oil circulates in oil bypass box 51 before being sent directly into servo controller 6 via a connecting means 6e.

Pump 60 here is of the high-pressure type 60, having the principal function of picking up oil from the bottom of oil pan 7 and delivering it to an oil filter located outside clutch housing 5.

The following paragraph will make it easier to understand the operation of the high-pressure oil circulation circuit:

Oil is drawn from the bottom of oil pan 7 by the high-pressure pump with the aid of a tube (not depicted) immersed in the oil reservoir. The tube is connected to a hydraulic inlet connector of the high-pressure pump. High-pressure pump 60 delivers oil firstly to an oil filter via an outlet connector 62. The oil, filtered as a result of its passage through the oil filter, returns to oil bypass box 51 via an inlet connector 55. The filtered oil circulates in oil bypass box 51 before being sent directly into servo controller 6 via a connecting means 6f.

The principal function of servo controller 6 is to control the supply of oil to the hydraulic piston chambers of clutches E1 and E2. For this, servo controller 6 sends pressurized oil into each of channels 52a, 52b, 52c, 52d of oil bypass box 51.

Oil bypass box 51 also has an oil inlet connector 56 connected to an oil reservoir located outside clutch housing 5. The oil circulating in bypass box 51 coming from the reservoir is directed toward servo controller 6 via a connecting means 6g.

Oil bypass box 51 also has channel plugs 53. Channel plugs 53 are force-fitted into the opening ends of channels 52a, 52b, 52c, 52d in order to ensure sealing of oil bypass box 51.

Figure 4:
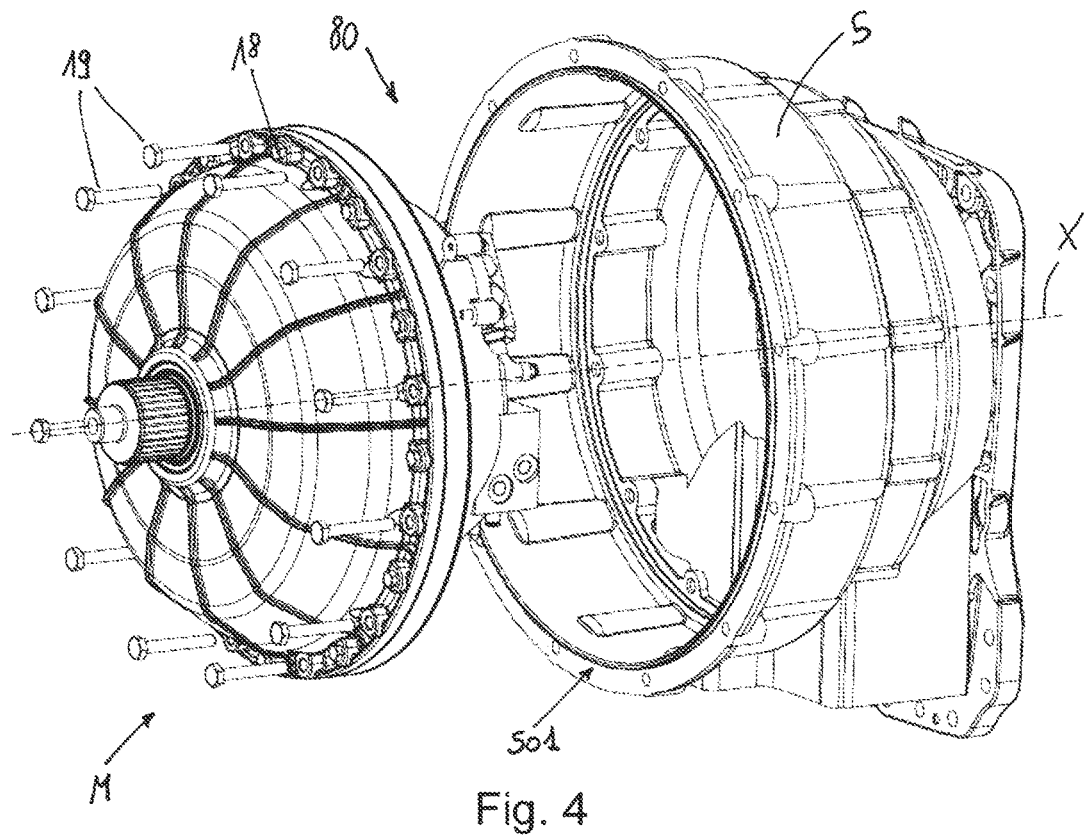
FIG. 4 is a perspective view of the torque transmission module and of the clutch housing of FIG. 1.
Figure 5:
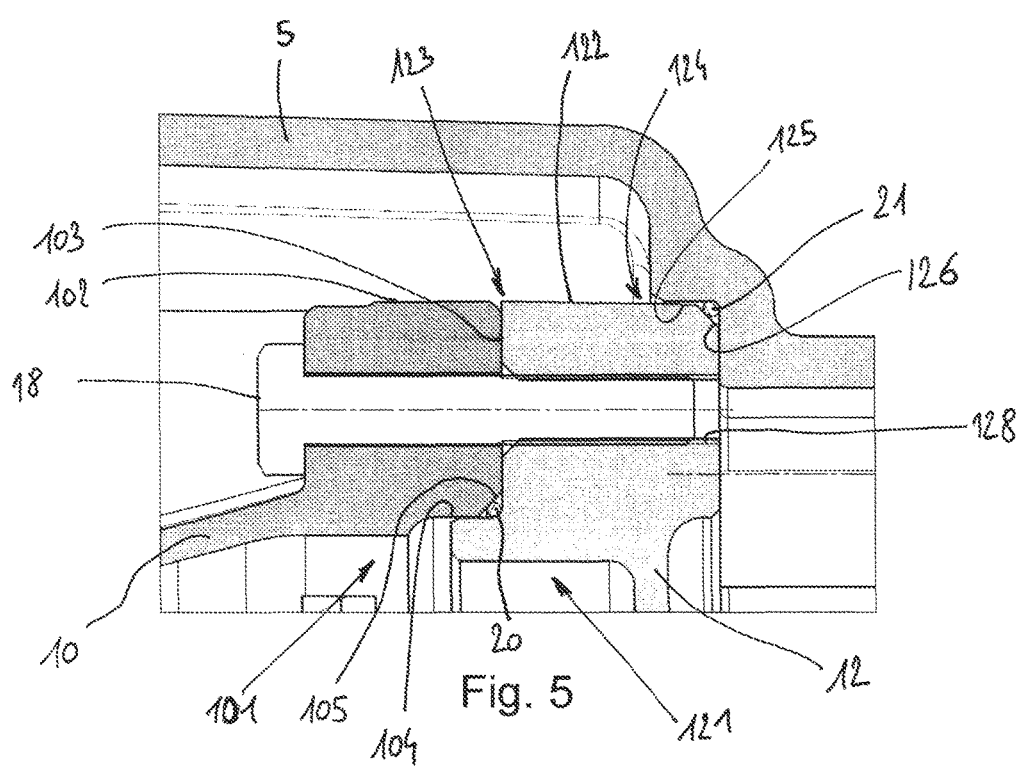
FIG. 5 is a partial, enlarged view of the sectioned view of the torque transmission module of FIG. 2.

FIGS. 4 and 5 depict a transmission assemblage 80 having:
clutch housing 5, and
torque transmission module M according to the invention.

Cover 10 of torque transmission module M, in the general shape of a bell, has a second opening 101 delimited on its edge by an annular collar 102 and located on the base of the cover. Annular collar 102 has a solid cross section intended to impart rigidity to cover 10. A circular abutment region 103 is configured on annular collar 102. It is arranged to come into abutment against a first abutment region 123 of clutch cover 12 of the motor vehicle transmission. Abutment region 103 has an inner cylindrical surface 104 for centering the cover on the clutch cover along axis X, and a planar abutment region. A connecting bevel 105 is configured between inner cylindrical surface 104 and the planar region. First and second openings 100, 101 of cover 10 are circular and concentric around axis X.

FIG. 5 is a detail view of the connection of cover 10 with respect to clutch cover 12. Cover 10 and clutch cover 12 are connected to one another by tightening a series of first fastening bolts 18. The series of first fastening bolts 18 is distributed circumferentially around axis X on the periphery of cover 10 and of clutch cover 12.

The function of torque transmission module M is in particular to contain the volume of oil necessary for the operation of double wet clutch mechanism 11. A gasket 20 is disposed between cover 10 and clutch cover 12, and is compressed by the tightening of the series of first fastening bolts 18.

Gasket 20 is of the O-ring type or flat-gasket type. The material of the gasket can be Nitrile™, Viton™. In order to limit the axial space requirement, gasket 20 is received in the space between connecting bevel 105 of cover 10 and first abutment region 123 of clutch cover 12.

As illustrated in FIGS. 4 and 5, clutch cover 12, in the general shape of a bell, has a second opening 121 delimited on its edge by an annular collar 122 and located on the base of the clutch cover. First and second openings 120, 121 of the clutch cover are circular and concentric around axis X.

Annular collar 122 has a solid cross section intended to impart stiffness to clutch cover 12. Annular collar 122 exhibits a series of tapped holes 128 able to receive the series of first fastening bolts 18.

A second circular abutment region 124 is configured on annular collar 122. It is arranged to come into abutment against an abutment region 501 of clutch housing 5 of the motor vehicle transmission. Second abutment region 124 of the clutch cover has an outer cylindrical surface 125 for centering the clutch cover on clutch housing 5 along axis X, and a planar abutment region. A connecting bevel 126 is configured between outer cylindrical surface 125 and the planar region.

Torque transmission module M and clutch housing 5 are connected to one another by tightening a series of second fastening bolts 19. The series of second fastening bolts 19 is distributed circumferentially around the axis (X) on the periphery of clutch cover 12. First fastening bolts 18 and second fastening bolts 19 are distributed circumferentially in alternating fashion around axis X.

The function of transmission assemblage 80 is in particular to contain the volume of oil necessary for the operation of torque transmission module M. A gasket 21 is disposed between torque transmission module M and clutch housing 5 of the motor vehicle transmission, and is compressed by the tightening of the series of second fastening bolts 19.

Gasket 21 is of the O-ring type. The material of the gasket can be Nitrile®, Viton® or like synthetic rubber and fluoropolymer elastomer.

In order to limit the axial space requirement, gasket 21 is received in the space between connecting bevel 126 of clutch cover 12 and abutment region 501 of clutch housing 5. According to another possible exemplifying embodiment, centering of the clutch cover on the clutch housing can be effected on an inner cylindrical surface for centering clutch cover 12. In this case the gasket can be installed radially on a diameter less than the installation diameter of the series of second fastening bolts 19.

As illustrated in FIGS. 3 and 7, clutch cover 12 also exhibits a third opening 129, in the general shape of a circular arc, configured on the flank of the clutch cover. This third opening 129 does not open into first and second openings 120, 121 of the clutch cover. Radially outer edge 130 that delimits third opening 129 is tangential to annular collar 122. The third opening is located in the lower portion of the clutch cover in a region in which the oil contained in the torque transmission module settles in response to gravity. In order to prevent oil from stagnating in this region, radially outer edge 130 of the third opening is disposed, with respect to rotation axis X, on a diameter greater than or equal to outer envelope 31 of the double wet clutch mechanism. Oil can then overflow more easily into the bottom of oil pan 7. The shape described for third opening 129 is not limiting. Third opening 129 can be replaced by a series of openings, of the drilled hole type, configured on the rim of annular collar 122.

The foregoing detailed description of the certain exemplary embodiments has been provided for the purpose of explaining the principles of the invention and its practical application, thereby enabling others skilled in the art to understand the invention for various embodiments and with various modifications as are suited to the particular use contemplated. This description is not necessarily intended to be exhaustive or to limit the invention to the precise embodiments disclosed. The specification describes specific examples to accomplish a more general goal that may be accomplished in another way.

The invention claimed is:

1. A torque transmission module (M) for a motor vehicle transmission (1), comprising:
a cover (10);
a double wet clutch mechanism (11) movable rotationally around an axis (X); and
a clutch cover (12) having an oil distribution device (50) configured to supply oil to the double wet clutch mechanism (11);
the cover (10) and the clutch cover (12) non-rotatably connected to one another to form a casing defining a receptacle in which the double wet clutch mechanism (11) is partly received, the casing configured to be received entirely or in part in a clutch housing (5) of the motor vehicle transmission (1).

2. The torque transmission module (M) according to claim 1, wherein the cover (10), the double wet clutch mechanism (11), and the clutch cover (12) are pre-assembled and form a unitary assemblage.

3. The torque transmission module (M) according to claim 1, wherein the oil distribution device (50) comprises at least one pump (60, 70) supported entirely or in part by the clutch cover (12).

4. The torque transmission module (M) according to claim 1, wherein the double wet clutch mechanism (11) has a splined torque input shaft (15) extending axially toward the outside of the module (M) and passing through the cover (10).

5. The torque transmission module (M) according to claim 4, wherein the cover (10), in the general shape of a bell, exhibits a first opening (100) located at the apex of the cover and arranged for passage of the splined torque input shaft (15).

6. The torque transmission module (M) according to claim 1, wherein the cover (10) and the clutch cover (12) are connected to one another by a series of first fastening bolts (18).

7. The torque transmission module (M) according to claim 1, wherein the clutch cover (12), in the general shape of a bell, exhibits a first opening (120) located at the apex of the clutch cover and arranged for passage of shafts of the motor vehicle transmission.

8. The torque transmission module (M) according to claim 7, wherein the clutch cover (12), in the general shape of a bell, exhibits a second opening (121) delimited on an edge thereof by an annular collar (122) and located on a base of the clutch cover (12).

9. The torque transmission module (M) according to claim 8, wherein the clutch cover (12) exhibits a third opening (129), in the general shape of a circular arc, configured on a flank of the clutch cover (12), a radially outer edge (130) of which delimits the third opening and is tangent to the annular collar (122).

10. The torque transmission module (M) according to claim 9, wherein the radially outer edge (130) of the third opening is disposed with respect to the axis (X) on a diameter greater than or equal to an outer envelope (31) of the double wet clutch mechanism (11).

11. The torque transmission module (M) according to claim 1, wherein the oil distribution device (50) has an oil bypass box (51) supported entirely or in part by the clutch cover (12).

12. The torque transmission module (M) according to claim 11, wherein the clutch cover (12), in the general shape of a bell, exhibits a first opening (120) located at the apex of the clutch cover and arranged for passage of shafts of the motor vehicle transmission, and wherein the oil bypass box (51) partly surrounds the first opening (120) of the clutch cover (12).

13. The torque transmission module (M) according to claim 12, wherein the oil distribution device (50) has a hub support (14) fastened on the clutch cover (12).

14. The torque transmission module (M) according to claim 13, wherein the hub support (14) has at least one oil supply channel (141) configured to convey oil from outside the torque transmission module (M) to the double wet clutch mechanism.

15. The torque transmission module (M) according to claim 14, wherein the oil bypass box (51) has at least one oil supply channel (52) configured to convey oil from outside the torque transmission module (M) to the double wet clutch mechanism (11).

16. The torque transmission module (M) according to claim 15, wherein the oil supply channel (52) of the oil bypass box (51) communicates with the oil supply channel (141) of the hub support (14).

17. The torque transmission module (M) according to claim 11, wherein the clutch cover (12), in the general shape of a bell, exhibits a first opening (120) located at the apex of the clutch cover and arranged for passage of shafts of the motor vehicle transmission, and wherein the oil bypass box (51) has oil supply channels (52) distributed circumferentially around the first opening (120) f the clutch cover (12).

18. The torque transmission module (M) according to claim 1, wherein the double wet clutch mechanism (11) includes an input shell (30) and first and second clutches (E1, E2) disposed in the input shell (30), and wherein the oil distribution device (50) disposed outside of the input shell (30) of the double wet clutch mechanism (11).

19. A transmission assemblage (80) for a motor vehicle, comprising:
a clutch housing (5); and
a torque transmission module (M) comprising
a cover (10);
a double wet clutch mechanism (11) movable rotationally around an axis (X); and
a clutch cover (12) having an oil distribution device configured to supply oil to the double wet clutch mechanism (11);
the cover (10) and the clutch cover (12) non-rotatably connected to one another to form a casing defining a receptacle in which the double wet clutch mechanism (11) is partly received, the casing received entirely or in part in the clutch housing (5).

20. The transmission assemblage (80) according to claim 19, wherein the clutch cover (12) of the torque transmission module (M) has a second circular abutment region (124) configured on the annular collar (122) and arranged to come into abutment against the clutch housing (5).

21. The transmission assemblage (80) according to claim 20, wherein the module (M) is fastened on the clutch housing (5) by a series of second fastening bolts (19).

22. A Transmission (1) for a motor vehicle, for selectively rotationally connecting at least one driven shaft (A1, A2) of the transmission to a driving shaft of a combustion engine, the transmission (I) comprising:
an engine flywheel (3) rotationally connected to the driving shaft, a mechanism (4) for filtering irregularities,
a gearbox, and
a torque transmission module (M) comprising
a cover (10);
a double wet clutch mechanism (11) movable rotationally around an axis)' a clutch cover (12) having an oil distribution device (50) configured to supply oil to the double wet clutch mechanism (11);
the cover (10) and the clutch cover (12) non-rotatably connected to one another to form a casing defining a receptacle in which the double wet clutch mechanism (11) is partly received, the casing received entirely or in part in a clutch housing (5) of the transmission (1).

23. A torque transmission module (M) for a motor vehicle transmission (1), comprising:
a cover (10);
a double wet clutch mechanism (11) movable rotationally around an axis (X); and a clutch cover (12) having an oil distribution device (50) configured to supply oil to the double wet clutch mechanism (11);

the cover (10) and the clutch cover (12) being assembled to form a casing defining a receptacle in which the double wet clutch mechanism (11) is partly received, the casing being able to be received entirely or in part in a clutch housing (5) of the motor vehicle transmission (1);

the cover (10), in the general shape of a bell, having an opening (101) delimited on its edge by an annular collar (102) and located on a base of the cover (10);

the cover (10) having a circular abutment region (123) configured on the annular collar (102) and arranged to come into abutment against the clutch cover (12).

* * * * *